Sept. 6, 1960         B. WEBB ET AL         2,951,517
SUPPORT AND HOLDDOWN MEANS FOR A POWER-OPERATED DADO CUTTER
Filed Aug. 17, 1959                         2 Sheets-Sheet 1
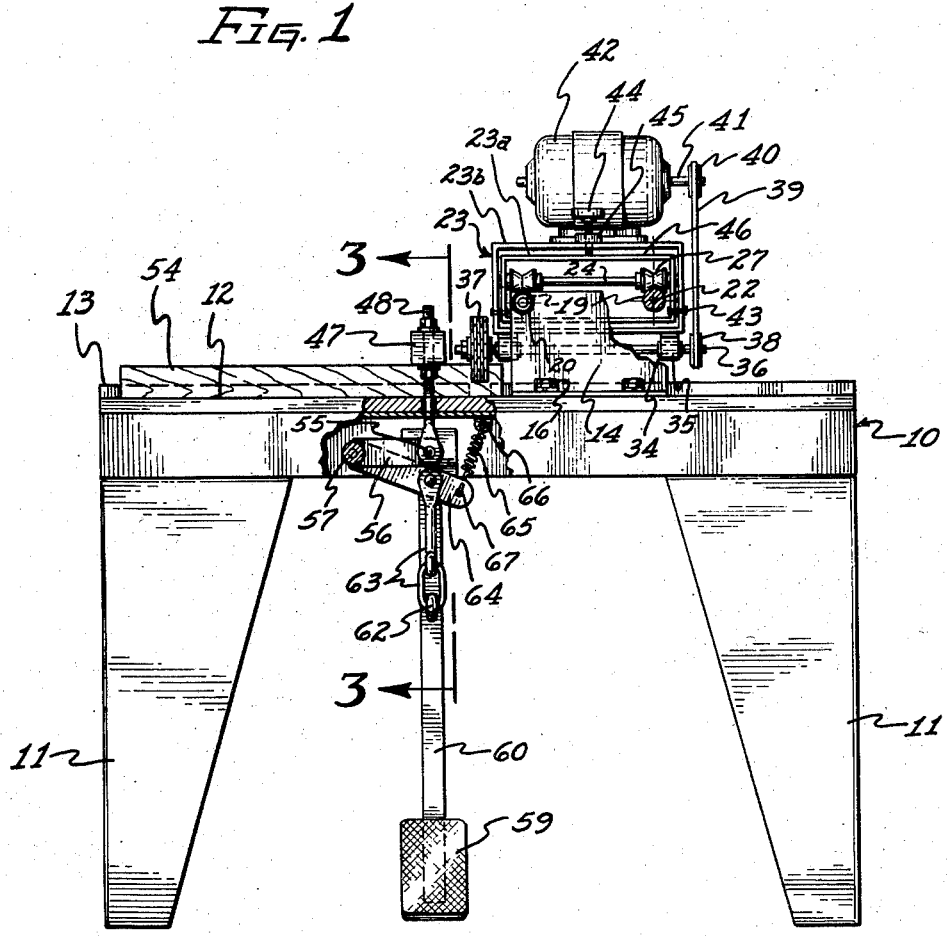
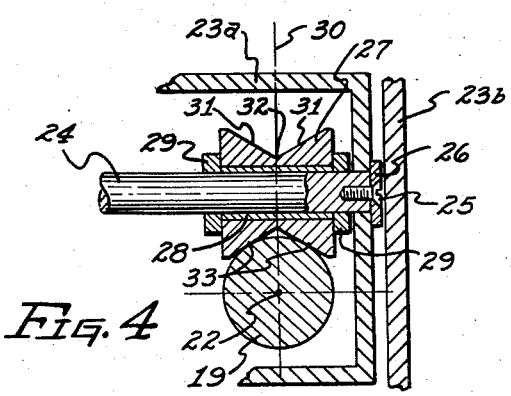
INVENTOR.
BERT WEBB ~AND~
JESSE PHILIP PEARCE.
Willard S. Grove
ATTORNEY.

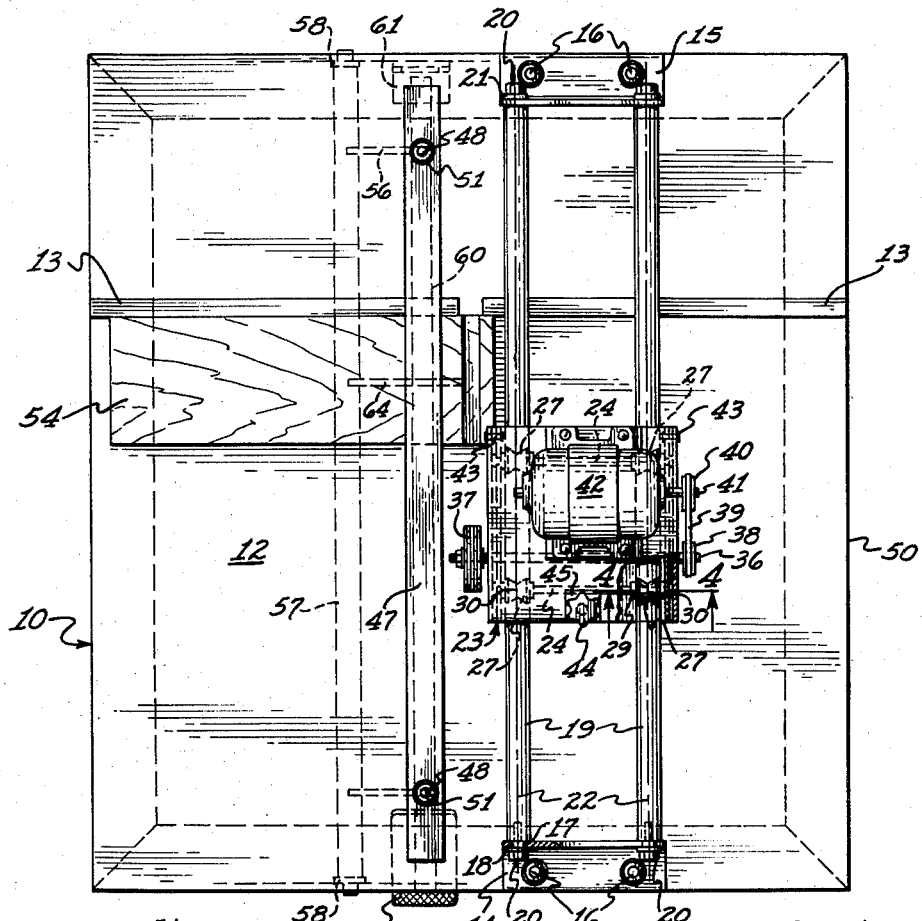
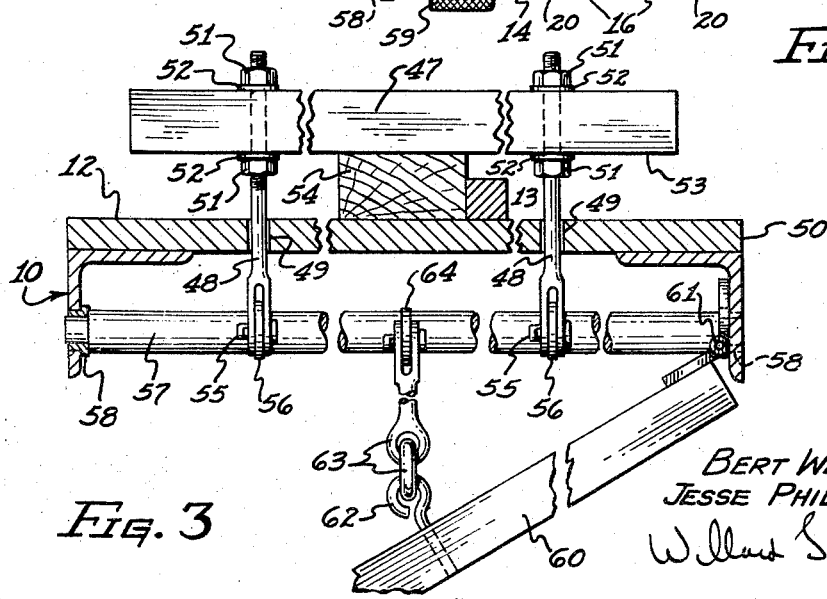

United States Patent Office 2,951,517
Patented Sept. 6, 1960

2,951,517

SUPPORT AND HOLDDOWN MEANS FOR A POWER-OPERATED DADO CUTTER

Bert Webb, 457 Pasadena St., Mesa, Ariz., and Jesse Philip Pearce, P.O. Box 281, Coupeville, Wash.

Filed Aug. 17, 1959, Ser. No. 834,231

4 Claims. (Cl. 144—133)

This invention pertains to improvements in woodworking machinery and is particularly directed to an improved dado machine.

One of the objects of this invention is to provide a dado machine of very high accuracy and precision so that very precise notching, slotting and dadoing of wood pieces can be accomplished resulting in highly accurate assembled units.

Another object of this invention is to provide a dado machine having transverse movement of the work table in a specially arranged precision functioning carriage for the cutter spindle.

Still another object of this invention is to provide an improved dado machine having simplified and accurate performing guideways for the dado cutter spindle units.

It is also an object of this invention to provide an improved clamping arrangement in conjunction with the aforementioned dado machine for rigidly holding the work against movement, slipping or vibration during the operation of the dado cutter across the workpiece.

Further features and advantages of this invention will appear from a detailed description of the drawings in which:

Fig. 1 is a front elevational view of a dado machine incorporating the features of the invention.

Fig. 2 is a plan view of the apparatus shown in Fig. 1.

Fig. 3 is an enlarged transverse section through the machine on the line 3—3 of Fig. 1.

Fig. 4 is an enlarged section showing the relation of the guide bars to the roller spools taken on the line 4—4 of Fig. 2.

As exemplar of one embodiment of this invention there is shown a dado machine having a table 10 supported on suitable legs 11 rigidly fixed to the underside of the table 10. The table 10 is provided with a suitable work supporting surface 12 and a back stop guide 13 for accurately positioning the work on the machine table. Upstanding support brackets 14 and 15 are fixed by suitable bolts 16 at each side of the table 10 and at their upper ends are provided with accurately machined bores 17 to receive the reduced ends 18 of the precision guideway bars 19 which are locked in place therein by suitable bolts 20 and washers 21 so that the axes 22 of each of the bars are in exact parallelism with each other and exactly parallel with the work surface of the table 10.

The dado cutter carriage 23 has a pair of shafts 24 suitably fixed therein by clamp screws 25 and washers 26 upon which are journaled the roller spools 27 on suitable bearings 28 and are confined against axial movement on the shafts 24 by the positioning collars 29 fixed to the shafts 24. The roller spools 27 are accurately positioned with their center axes 30 of the V-shaped surfaces 31 of the point of intersection 32 of the spool surfaces 31 in exact spacing with the axes 22 of the precision guideway bars 19, these tapered conical surfaces 31 riding on the bars 19 at the points 33 so that the dado cutter carriage 23 may be very easily pushed back and forth on the bars 19 while maintaining very precise and exact alignment of transverse travel relative to the work table surface 12 of the machine.

Journaled in suitable bearings 34 carried in suitable housings 35 fixed to the dado cutter carriage 23 is the cutter spindle 36 upon the outer end of which is fixed a suitable dado cutter 37 in the usual manner. And on the other end of the spindle 36 is fixed the driven pulley 38 over which operates the drive belt 39 in turn operating over the output pulley 40 on the shaft 41 of a suitable electric drive motor 42 fixed on the dado cutter carriage 23.

In certain instances it may be desirable to construct the dado cutter carriage 23 in two parts in which case a separate inner part 23a may be utilized to carry the shafts 24 and spools 27 with the outer portion 23b carrying the cutter spindle, bearing housings 35 and the motor 42 which may be adjustable relative thereto for raising and lowering the dado cutter 37 relative to the work surface 12 of the table 10. This is accomplished by pivoting the portion 23b on suitable pivot pins 43 while providing an adjusting screw 44 threaded in the plate 45 fixed to the portion 23b and engaging the top surface 46 of the member 23a for relative up and down adjustment of the spindle and dado cutter 37 over the work table surface 12 as required. It is also to be understood that the relative major changes in height between the dado cutter 37 and the work table 12 may be accomplished by varying the heights of the upstanding brackets 14 and 15 as required.

A suitable work clamp 47 is provided transversely of the work table surface 12 and includes a pair of vertically slidable rods 48 guided in vertical bores 49 formed in the table top 50. Suitable clamp nuts 51 and washers 52 accurately position and hold the clamp bar 47 with its work engaging surface 53 in correct alignment with the work surface 12 of the table 10 so as to properly engage the workpiece 54 on the table surface 12. The lower ends of the rods 48 are each pivotally connected by suitable pins 55 to the outer ends of clevis arms 56 in turn fixed to the rockshaft 57 pivotally mounted in suitable bearings 58 in the table 10 so that both rods 48 are moved in exact synchronism so as to maintain the parallelism of movement of the surface 53 of the clamp bar 47 with the work surface 12 of the table 10. An operating foot pedal 59 is carried on the pedal bar 60 pivoted at its rear end on a suitable hinge at 61. Intermediate its ends the bar 60 is provided with an eyebolt 62 which is pivotally connected by a link clevis rod 63 to the clevis arm 64 also fixed to the rockshaft 57 so that up and down movements of the pedal 59 will effect the rocking of the rockshaft 57 and the operation of the clamp 47. A suitable tension spring 65 is fixed at 66 to the table 10 and at the point 67 to the outer end of the clevis arm 64 so as to normally return the pedal 59 and clamp 47 to upward release position when the foot is taken from the pedal 59.

In operation the operator places the workpiece 54 on the work table surface 12 in proper alignment thereon, then holds his foot on the pedal 59 while grasping the carriage 23 and pulling it transversely across the workpiece to cut the desired notch or dado in the work to be machined. Because of the precise alignment maintained at the points 33 on the bars 19 very accurate and precise data as to depth, width and position of the cut on the workpiece is accomplished so that the subsequent fitting of the parts results in a very accurate and precise piece of cabinet work. It is also to be noted that by means of this structure sawdust, dust and shavings will tend to fall from the cylindrical surfaces of the bars 19 and that the rollers do not become clogged and jammed and inaccurate because of the crushing action of the rollers at the points 33 in traversing the bars 19. Thus an overall accuracy of the machine maintains itself at all times with a minimum of maintenance and work being required to keep the machine in proper precision order.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a dado machine having a base, a work table mounted on said base, a pair of upstanding brackets at the front and rear of said work table, transversely disposed precision parallel guideway bars mounted on the upper ends of said upstanding brackets and extending transversely across said work table, a dado cutter carriage having parallel shafts fixed therein, spools journaled against axial movement on each of said shafts having V-grooves therein engaging in rolling action the upper surfaces of said parallel guide bars so as to freely support said carriage for transverse movement over said bars across said work table, a dado cutter spindle journaled on said dado cutter carriage, a dado cutter on one end of said spindle, and motor drive means mounted on said carriage connected to rotate said dado cutter and spindle.

2. In a dado machine as set forth in claim 1 wherein there is provided a work clamp comprising a transverse bar to one side of said carriage and adjacent the dado cutter, a foot treadle, means for connecting said foot treadle to said transverse bar to downwardly move and hold said clamp bar against a work piece on said table, and means for normally returning said clamp bar to upward released position of said pedal when the latter is released from foot pressure.

3. A dado machine carriage structure comprising a pair of horizontally disposed radially spaced parallel guide bars extending transversely over the work table of the dado machine, a dado cutter carriage including a a frame, means for rotatably supporting a dado spindle on said frame, a dado cutter on said spindle, and power means on said frame for rotating said cutter spindle, an anti friction guide means on said carriage engaging said parallel guide bars for sliding movement of said dado spindle carriage along said guide bars.

4. In a dado machine carriage as set forth in claim 3 wherein said guide means on said carriage engaging said parallel bars includes a pair of roller spools axially and radially spaced and rollingly engaging the upper portions of said parallel guide bars, said spools being journaled against axial movement on said carriage during engagement of said roller spools with said guide bars during the lateral shifting of said carriage across the work table of said dado machine.

References Cited in the file of this patent

UNITED STATES PATENTS

| 411,811 | Heysinger | Oct. 1, 1889 |
| 1,224,676 | Sherman | May 1, 1917 |
| 1,595,674 | Marshall | Aug. 10, 1926 |
| 1,794,397 | Brown | Mar. 3, 1931 |
| 2,290,394 | Vanderveld | July 21, 1942 |
| 2,353,794 | Svikhart | July 18, 1944 |
| 2,753,900 | Bjork | July 10, 1956 |

FOREIGN PATENTS

| 510,314 | France | Sept. 2, 1920 |